(12) United States Patent
Feng et al.

(10) Patent No.: US 9,055,484 B2
(45) Date of Patent: Jun. 9, 2015

(54) DATA TRANSMISSION METHOD, BASE STATION AND TERMINAL

(75) Inventors: Shulan Feng, Beijing (CN); Jinnan Liu, Beijing (CN); Yajuan Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 433 days.

(21) Appl. No.: 13/542,963

(22) Filed: Jul. 6, 2012

(65) Prior Publication Data

US 2012/0270585 A1 Oct. 25, 2012

Related U.S. Application Data

(63) Continuation of application No. PCT/CN2010/070108, filed on Jan. 11, 2010.

(51) Int. Cl.
| | |
|---|---|
| H04B 1/18 | (2006.01) |
| H04W 28/20 | (2009.01) |
| H04W 28/16 | (2009.01) |
| H04W 8/22 | (2009.01) |

(52) U.S. Cl.
CPC .............. *H04W 28/20* (2013.01); *H04W 28/16* (2013.01); *H04W 8/22* (2013.01)

(58) Field of Classification Search
USPC .......... 455/176.1, 177.1, 180.1, 266, 703, 71, 455/105, 507; 370/468, 480
See application file for complete search history.

(56) References Cited

U.S. PATENT DOCUMENTS

| | | | |
|---|---|---|---|
| 6,097,733 A | 8/2000 | Basu et al. | |
| 6,381,460 B1 | 4/2002 | Klein et al. | |
| 2003/0002537 A1* | 1/2003 | Schaller | 370/503 |
| 2003/0073438 A1* | 4/2003 | Fukushima et al. | 455/432 |
| 2007/0177552 A1* | 8/2007 | Wu et al. | 370/335 |
| 2009/0147735 A1* | 6/2009 | Ghosh et al. | 370/329 |
| 2009/0202010 A1* | 8/2009 | Fu et al. | 375/260 |
| 2009/0210444 A1* | 8/2009 | Bailey et al. | 707/103 R |
| 2009/0285139 A1* | 11/2009 | Bhattad et al. | 370/310 |
| 2009/0286501 A1 | 11/2009 | Rousu et al. | |
| 2009/0290597 A1 | 11/2009 | Baumgartner et al. | |
| 2010/0022264 A1 | 1/2010 | Kwon et al. | |
| 2010/0034120 A1* | 2/2010 | Nakajima | 370/255 |
| 2010/0291934 A1* | 11/2010 | Lopes | 455/446 |

FOREIGN PATENT DOCUMENTS

| | | |
|---|---|---|
| CN | 1282499 | 1/2001 |
| CN | 101227223 | 7/2008 |
| CN | 101536573 | 9/2009 |

OTHER PUBLICATIONS

International Search Report mailed May 6, 2010 issued in corresponding International Patent Application No. PCT/CN2010/070108.

(Continued)

*Primary Examiner* — Dominic E Rego
(74) *Attorney, Agent, or Firm* — Staas & Halsey LLP (57) ABSTRACT

Embodiments of the present invention disclose a data transmission method, a base station, and a terminal. The method includes: configuring a band of standard bandwidth within transmission bandwidth of a base station as terminal-specific standard bandwidth when the transmission bandwidth of the base station is nonstandard bandwidth; notifying a terminal of configuration information of the terminal-specific standard bandwidth; and performing data transmission with the terminal within the terminal-specific standard bandwidth. The preceding technical solution is applicable to data transmission between a base station and a terminal in a communication system.

17 Claims, 7 Drawing Sheets

(56) References Cited

OTHER PUBLICATIONS

Written Opinion of the International Searching Authority mailed May 6, 2010 issued in corresponding International Patent Application No. PCT/CN2010/070108.

Chinese Office Action mailed Jan. 29, 2013, issued in corresponding Chinese Patent Application No. 201080003280.1.
International Search Report of PCT/CN2010/070108 mailed May 6, 2010.

* cited by examiner

DATA TRANSMISSION METHOD, BASE STATION AND TERMINAL

CROSS-REFERENCE TO RELATED APPLICATIONS

This application is a continuation of International Application No. PCT/CN2010/070108, filed on Jan. 11, 2010, which is hereby incorporated by reference in its entirety.

FIELD OF THE INVENTION

The present invention relates to the field of communications technologies, and in particular, to a data transmission method, a base station, and a terminal.

BACKGROUND OF THE INVENTION

In a communication system, to reduce complexity of implementation of a terminal, generally, only several types of standard bandwidth are defined, and only filters with different standard bandwidth need to be designed for the terminal to support standard bandwidth. For example, in the 3GPP (Third Generation Partnership Project, third generation partnership project) LTE (Long Term Evolution, long term evolution), only six types of standard bandwidth: 1.4 MHz, 3 MHz, 5 MHz, 10 MHz, 15 MHz, and 20 MHz are defined, but available spectrums owned by an operator are not limited to the standard bandwidth. In the prior art, two solutions of using nonstandard bandwidth are proposed:

Solution 1: Divide nonstandard bandwidth into a combination of standard bandwidth, for example, an 8 MHz nonstandard bandwidth may be divided into two carriers: a 3 MHz standard bandwidth and a 5 MHz standard bandwidth, and the standard bandwidth is combined into nonstandard bandwidth by using a carrier aggregation manner.

Solution 2: Add a supported standard bandwidth, for example, add other standard bandwidth such as 7 MHz, 8 MHz, and 9 MHz apart from the existing six types of standard bandwidth.

In a process of implementing the present invention, the inventor finds that the prior art has at least the following problems:

When solution 1 is adopted, not all nonstandard bandwidth can be divided into a combination of standard bandwidth. For example, for a 9 MHz nonstandard bandwidth, even if a 3 MHz standard bandwidth is aggregated with a 5 MHz standard bandwidth, a 1 MHz bandwidth is still wasted; and when solution 2 is adopted, because more types of standard bandwidth are introduced, design of a filter of the terminal is more complicated, so that the complexity of implementation of the terminal is increased.

SUMMARY OF THE INVENTION

Embodiments of the present invention provide a data transmission method, a base station, and a terminal, so that an available bandwidth can be fully utilized without increasing complexity of implementation of the terminal.

Technical solutions adopted in the embodiments of the present invention are:

A data transmission method includes:
configuring a band of standard bandwidth within transmission bandwidth of a base station as terminal-specific standard bandwidth when the transmission bandwidth of the base station is nonstandard bandwidth;
notifying a terminal of configuration information of the terminal-specific standard bandwidth; and
performing data transmission with the terminal within the terminal-specific standard bandwidth.

A data transmission method includes:
receiving configuration information of terminal-specific standard bandwidth, where the configuration information is notified by a base station, the terminal-specific standard bandwidth is a band of standard bandwidth within transmission bandwidth of the base station, and the transmission bandwidth of the base station is nonstandard bandwidth; and
performing data transmission with the base station by using the terminal-specific standard bandwidth.

A base station includes:
a configuring module, configured to configure a band of standard bandwidth within transmission bandwidth of a base station as terminal-specific standard bandwidth when the transmission bandwidth of the base station is nonstandard bandwidth;
a notifying module, configured to notify a terminal of configuration information of the terminal-specific standard bandwidth; and
a data transmission module, configured to perform data transmission with the terminal within the terminal-specific standard bandwidth.

A terminal includes:
a notification receiving module, configured to receive configuration information of terminal-specific standard bandwidth, where the configuration information is notified by a base station, the terminal-specific standard bandwidth is a band of standard bandwidth within transmission bandwidth of the base station, and the transmission bandwidth of the base station is nonstandard bandwidth; and
a data transmission module, configured to perform data transmission with the base station by using the terminal-specific standard bandwidth.

With the data transmission method, base station and terminal that are provided in the embodiments of the present invention, the base station configures terminal-specific standard bandwidth according to the transmission bandwidth of the base station, and notifies the terminal of the configuration information of the terminal-specific standard bandwidth, and data transmission is performed between the base station and the terminal within the terminal-specific standard bandwidth. Compared with the prior art, the base station configures standard bandwidth of different terminals into the transmission bandwidth of the base station, therefore fully utilizing the transmission bandwidth of the base station; meanwhile, for one terminal, the terminal always receives a signal by using standard bandwidth, so that the complexity of implementation of the terminal is not increased.

BRIEF DESCRIPTION OF THE DRAWINGS

To describe the technical solutions in the embodiment of the present invention or in the prior art more clearly, the accompanying drawings required for describing the embodiments or the prior art are briefly introduced in the following. Apparently, the accompanying drawings in the following description are only some embodiments of the present invention, and persons skilled in the art may still derive other drawings from these accompanying drawings without creative efforts.

DETAILED DESCRIPTION OF THE EMBODIMENTS

The technical solutions in the embodiments of the present invention are clearly and completely described in the following with reference to the accompanying drawings in the embodiments of the present invention. Apparently, the embodiments to be described are only part of rather than all of the embodiments of the present invention. Based on the embodiments of the present invention, all other embodiments obtained by those skilled in the art without making creative efforts shall fall within the protection scope of the present invention.

To make the advantages of the technical solutions in the present invention clearer, the present invention is described in detail in the following with reference to the accompanying drawings and the embodiments.

Embodiment 1

Figure 1:
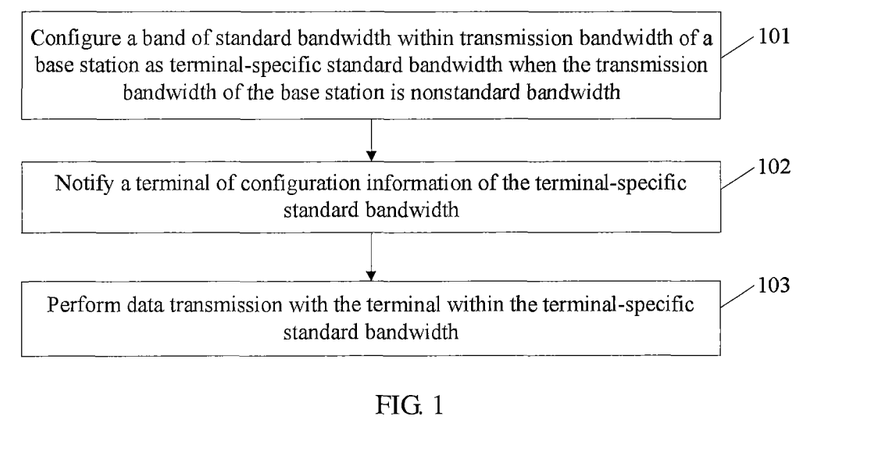
FIG. 1 is a flowchart of a method according to Embodiment 1 of the present invention.

An embodiment of the present invention provides a data transmission method. As shown in FIG. 1, on a base station side, the method includes:

101: Configure a band of standard bandwidth within transmission bandwidth of a base station as terminal-specific standard bandwidth when the transmission bandwidth of the base station is nonstandard bandwidth.

102: Notify a terminal of configuration information of the terminal-specific standard bandwidth.

103: Perform data transmission with the terminal within the terminal-specific standard bandwidth.

With the data transmission method provided in this embodiment of the present invention, the base station sets different terminal-specific standard bandwidth for different terminals according to the transmission bandwidth of the base station, notifies the terminal of the configuration information of the terminal-specific standard bandwidth, and performs data transmission with the terminal within the terminal-specific standard bandwidth. Compared with the prior art, the base station can control data that is sent to the terminal within different standard bandwidth within the transmission bandwidth of the base station, therefore fully utilizing the transmission bandwidth of the base station; meanwhile, for one terminal, the terminal always receives a signal by using standard bandwidth, so that complexity of implementation of the terminal is not increased. Because the terminal-specific standard bandwidth is configured by the base station for the terminal, a position of terminal-specific standard bandwidth configured for each terminal may not be fixed in the transmission bandwidth of the base station. Alternatively, in a bandwidth configuration manner in this embodiment, terminal-specific standard bandwidth of at least two terminals cover a part of frequency band beyond each other's range, so that multiple terminals can occupy the transmission bandwidth of the base station as much as possible, therefore improving a utilization ratio of the transmission bandwidth of the base station.

Embodiment 2

Figure 2:
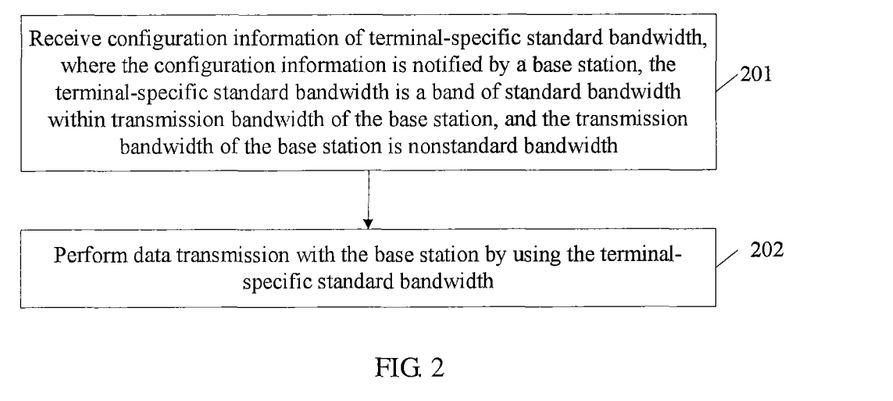
FIG. 2 is a flowchart of a method according to Embodiment 2 of the present invention.

An embodiment of the present invention provides a data transmission method. As shown in FIG. 2, on a terminal side, the method includes:

201: Receive configuration information of terminal-specific standard bandwidth, where the configuration information is notified by a base station, the terminal-specific standard bandwidth is a band of standard bandwidth within transmission bandwidth of the base station, and the transmission bandwidth of the base station is nonstandard bandwidth.

202: Perform data transmission with the base station by using the terminal-specific standard bandwidth.

With the data transmission method provided in this embodiment of the present invention, a terminal receives the configuration information of the terminal-specific standard bandwidth, where the configuration information is sent by the base station, and performs data transmission with the base station by using the terminal-specific standard bandwidth. Compared with the prior art, the base station can control data that is sent to the terminal within different standard bandwidth within the transmission bandwidth of the base station, therefore fully utilizing the transmission bandwidth of the base station; meanwhile, for one terminal, the terminal always receives a signal by using standard bandwidth, so that complexity of implementation of the terminal is not increased.

Embodiment 3

Figure 3:
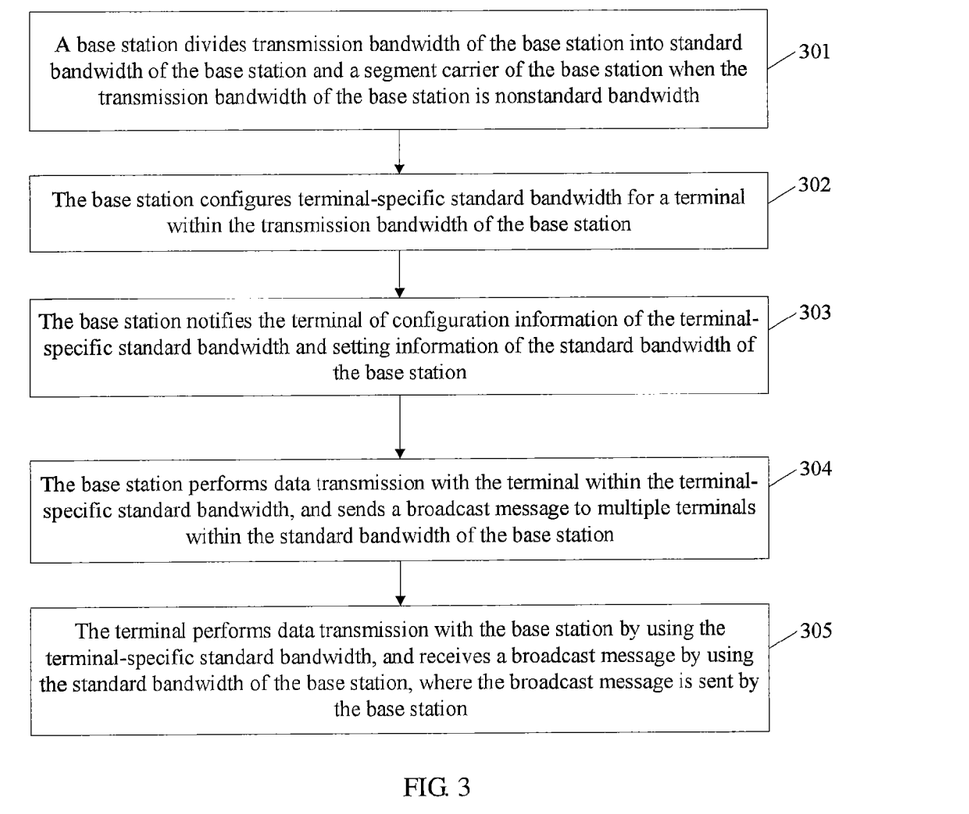
FIG. 3 is a flowchart of a method according to Embodiment 3 of the present invention.

As shown in FIG. 3, the data transmission method includes:

301: A base station divides transmission bandwidth of the base station into standard bandwidth (also known as a standard carrier of the base station) of the base station and a segment carrier of the base station when the transmission bandwidth of the base station is nonstandard bandwidth.

In the 3GPP LTE REL-8, six types of standard bandwidth are defined: 1.4 MHz, 3 MHz, 5 MHz, 10 MHz, 15 MHz, and 20 MHz. Except for a guard band, each type of standard bandwidth corresponds to available transmission bandwidth of 6 RBs (Resource Block, resource block), 15 RBs, 25 RBs, 50 RBs, 75 RBs, and 100 RBs respectively, where each RB is 180 KHz. In this embodiment, the bandwidth is bandwidth that may be used for transmission, and does not include a guard band.

Any standard bandwidth less than the transmission bandwidth of the base station may be set as the standard bandwidth of the base station. Alternatively, standard bandwidth that is closest to and less than the transmission bandwidth of the base station is set as the standard bandwidth of the base station. For example, when the transmission bandwidth of the base station is 60 RBs, the standard bandwidth of the base station may be set to 6 RBs, 15 RBs, 25 RBs, or 50 RBs, and alternatively, the standard bandwidth of the base station is set to 50 RBs.

Figure 4A:
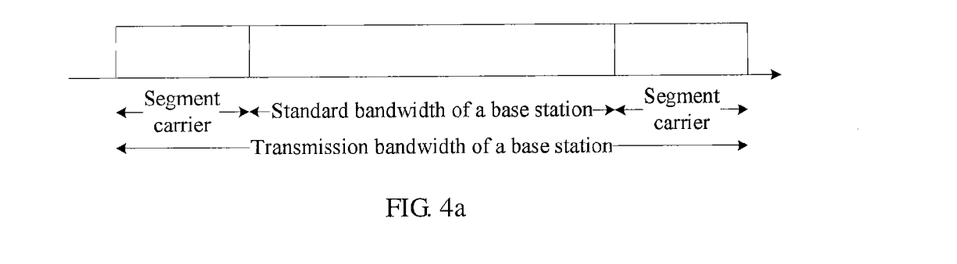
FIG. 4a and FIG. 4b are schematic diagrams of setting standard bandwidth of a base station according to Embodiment 3 of the present invention.

Alternatively, as shown in FIG. 4a, bandwidth on both sides of a central frequency band of the transmission bandwidth of the base station may be set as standard bandwidth of the base station, and another frequency band is set as a segment carrier (Segment Carrier).

Figure 4B:
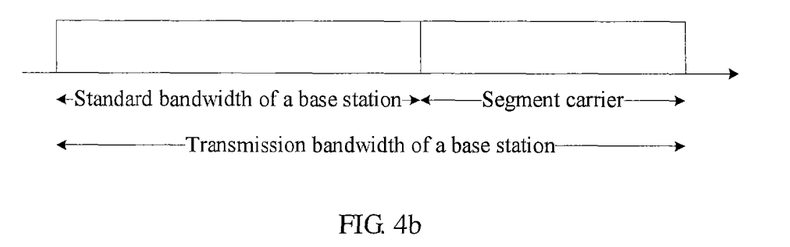

Alternatively, as shown in FIG. 4b, the transmission bandwidth of the base station may be divided into two parts. One part is standard bandwidth of the base station, and the other part is a segment carrier.

In all embodiments of the present invention, the bandwidth refers to a band of a frequency band, including the size of the frequency band and a position of the frequency band in a spectrum, or refers to the size of the frequency band. According to the context, those skilled in the art may know whether the bandwidth refers to a frequency band or the size of a frequency band.

302: The base station configures terminal-specific standard bandwidth for a terminal within the transmission bandwidth of the base station.

Figure 5:
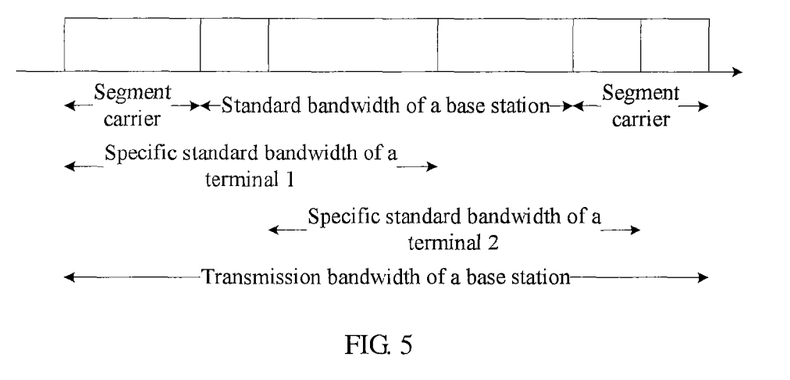
FIG. 5 is a schematic diagram of setting terminal-specific standard bandwidth according to Embodiment 3 of the present invention.

Any standard bandwidth that is less than the transmission bandwidth of the base station and within the transmission bandwidth of the base station may be set as the terminal-specific standard bandwidth. As shown in FIG. 5, a position of terminal-specific standard bandwidth of each terminal may be different. Terminal-specific standard bandwidth of a terminal may also include a segment carrier. In this embodiment, at the time of configuring terminal-specific standard bandwidth for multiple terminals each, among the configured terminal-specific standard bandwidth of the multiple terminals, at least two bands of terminal-specific standard bandwidth may cover a part of frequency band beyond each other's range. For example, in FIG. 5, terminal-specific standard bandwidth configured by the base station for two terminals each covers a part of a frequency band beyond each other's range. Therefore, compared to the condition that two terminals use the same frequency band, frequency bands used by different terminals in the transmission bandwidth of the base station are added, therefore improving a utilization ratio of a bandwidth. It may be understood that, if the terminal-specific standard bandwidth of multiple terminals covers the whole transmission bandwidth of the base station as much as possible, the transmission bandwidth of the base station is effectively utilized.

The size of terminal-specific standard bandwidth of each terminal may be configured as the same as that of the standard bandwidth of the base station, and may also be different from that of the standard bandwidth of the base station. Alternatively, the size of the terminal-specific standard bandwidth is configured as the same as that of the standard bandwidth of the base station. For example, if the transmission bandwidth of the base station is 60 RBs and the standard bandwidth of the base station is 50 RBs, the terminal-specific standard bandwidth is alternatively configured as 50 RBs.

Alternatively, it is predetermined that the terminal-specific standard bandwidth is equal to the standard bandwidth of the base station.

303: The base station notifies the terminal of configuration information of the terminal-specific standard bandwidth and setting information of the standard bandwidth of the base station.

The configuration information of the terminal-specific standard bandwidth may include the size and position information of the terminal-specific standard bandwidth, for example, the size and a starting position of the terminal-specific standard bandwidth. If it is predetermined that the size of the terminal-specific standard bandwidth is equal to that of the standard bandwidth of the base station, the configuration information of the terminal-specific standard bandwidth may include only the position information of the terminal-specific standard bandwidth. For example, the configuration information of the terminal-specific standard bandwidth includes only starting position information of the terminal-specific standard bandwidth.

Further, the base station may set only positions of several types of terminal-specific standard bandwidth within the transmission bandwidth of the base station, so as to reduce complexity of resource scheduling. For example, if the transmission bandwidth of the base station is 70 RBs, and the standard bandwidth of the base station is 50 RBs in 10 RBs to 59 RBs, the base station may set the size of the terminal-specific standard bandwidth to 50 RBs. The standard bandwidth of the base station includes two types of terminal-specific standard bandwidth. One type of terminal-specific standard bandwidth is located in 0 RB to 49 RBs, and the other type of terminal-specific standard bandwidth is located in 20 RBs to 69 RBs. The base station sets that terminal-specific standard bandwidth of part of terminals is located in 0 RB to 49 RBs, and sets that terminal-specific standard bandwidth of another part of terminals is located in 20 RBs to 69 RBs. Accordingly, the base station may notify the terminal of only sizes and positions of the two types of terminal-specific standard bandwidth, and respectively notifies each terminal which type of terminal-specific standard bandwidth in the two types of terminal-specific standard bandwidth is allocated to the terminal.

Further, the configuration information of the terminal-specific standard bandwidth may include effective time of the terminal-specific standard bandwidth. The predetermined effective time is the time when the terminal receives the terminal-specific standard bandwidth configured by the base station.

The base station may notify the terminal of the configuration information of the terminal-specific standard bandwidth through higher-layer signaling such as RRC (Radio Resource Control, radio resource control) signaling, or through MAC (Media Access Control, media access control) layer signaling or physical layer signaling. A common implementation manner is that the base station notifies the terminal of the configuration information of the terminal-specific standard bandwidth through higher-layer signaling such as RRC signaling. The configuration information of the terminal-specific standard bandwidth may be updated at the time of establishing an RRC connection, reconfiguring an RRC connection, and re-establishing an RRC connection, or other time of configuring or reconfiguring a radio resource.

For a manner of notifying the setting information of the standard bandwidth of the base station, refer to a manner of notifying the terminal-specific standard bandwidth. For example, in 3GPP LTE REL8 and later versions, an MIB (Master Information Block, master information block) message may carry the size of the standard bandwidth of the base station, and the terminal obtains the standard bandwidth of the base station by parsing the MIB message.

304: The base station performs data transmission with the terminal within the terminal-specific standard bandwidth.

Further, perform transmission of non terminal-specific data with the terminal within the standard bandwidth of the base station, for example, send a broadcast message.

Specifically, when the terminal accesses the base station initially, the base station performs data transmission with the terminal by using the standard bandwidth of the base station; after the terminal receives the configuration information of the terminal-specific standard bandwidth, where the configuration information is sent by the base station, the base station performs data transmission with the terminal by using the terminal-specific standard bandwidth.

Further, data sent by the base station includes data that is sent to a group of terminals or all terminals, such as a system message, a paging message, common control channel data, and synchronization channel data, which are collectively called a broadcast message; and the data also includes specific data that is sent to only a specific terminal. The base station sends a broadcast message to a group of terminals or all terminals within the standard bandwidth of the base station, and sends specific data to a specific terminal within the terminal-specific standard bandwidth.

For example, a physical synchronization channel (including a primary synchronization signal and a secondary synchronization signal), a physical downlink control channel (PDCCH), a physical broadcast channel (PBCH), a physical control format indicator channel (PCFICH), a physical hybrid automatic repeat request indicator channel (PHICH), and a downlink shared channel (PDSCH) and an uplink shared channel (PUSCH) that are indicated by a PDCCH transmitted in a common search space of an LTE user equipment are sent and received within the standard bandwidth of the base station; and a PDSCH and/or a PUSCH that is indicated by a PDCCH transmitted in a specific search space of the LTE user equipment is sent and/or received within the terminal-specific standard bandwidth.

Figure 6:
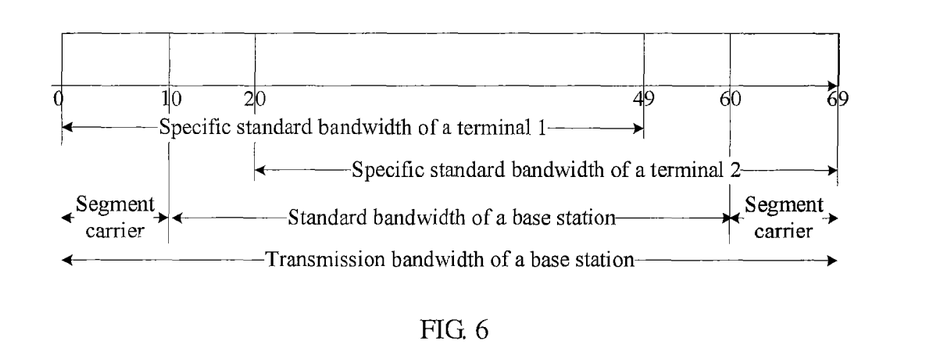
FIG. 6 is a schematic diagram of adjusting a receiving center frequency of a terminal according to Embodiment 3 of the present invention.

Further, the terminal may need to receive both a broadcast message from the base station and terminal-specific data in the same subframe, and therefore, a broadcast message may be sent to the multiple terminals within a bandwidth range shared by the standard bandwidth of the base station and terminal-specific standard bandwidth of the multiple terminals, that is, the base station sends a broadcast message on an overlapping bandwidth between the standard bandwidth of the base station and the terminal-specific standard bandwidth of the multiple terminals. When scheduling a transmission resource of the broadcast message, the base station schedules the transmission resource on terminal-specific standard bandwidth of all terminals that receive terminal-specific data and a broadcast message simultaneously in the subframe to the greatest extent. As shown in FIG. 6, for example, if the transmission bandwidth of the base station is 70 RBs, the standard bandwidth of the base station is 50 RBs in 10 RBs to 59 RBs, the terminal-specific standard bandwidth is 50 RBs, the terminal-specific standard bandwidth of a terminal 1 is located in 0 RB to 49 RBs, the terminal-specific standard bandwidth of a terminal 2 is located in 20 RBs to 69 RBs, and the base station has only two terminals that need to receive a broadcast message in the same subframe. In such case, the base station preferably schedules a broadcast message on 20 RBs to 49 RBs when scheduling the broadcast message.

305: The terminal performs data transmission with the base station by using the terminal-specific standard bandwidth.

Further, the terminal receives a broadcast message by using the standard bandwidth of the base station, where the broadcast message is sent by the base station.

When the base station sends a broadcast message to a group of terminals or all terminals within the standard bandwidth of the base station, the terminal receives the broadcast message by using the standard bandwidth of the base station accordingly; when the base station sends specific data to a specific terminal within the terminal-specific standard bandwidth, the terminal receives the specific data by using the terminal-specific standard bandwidth accordingly.

Figure 7:
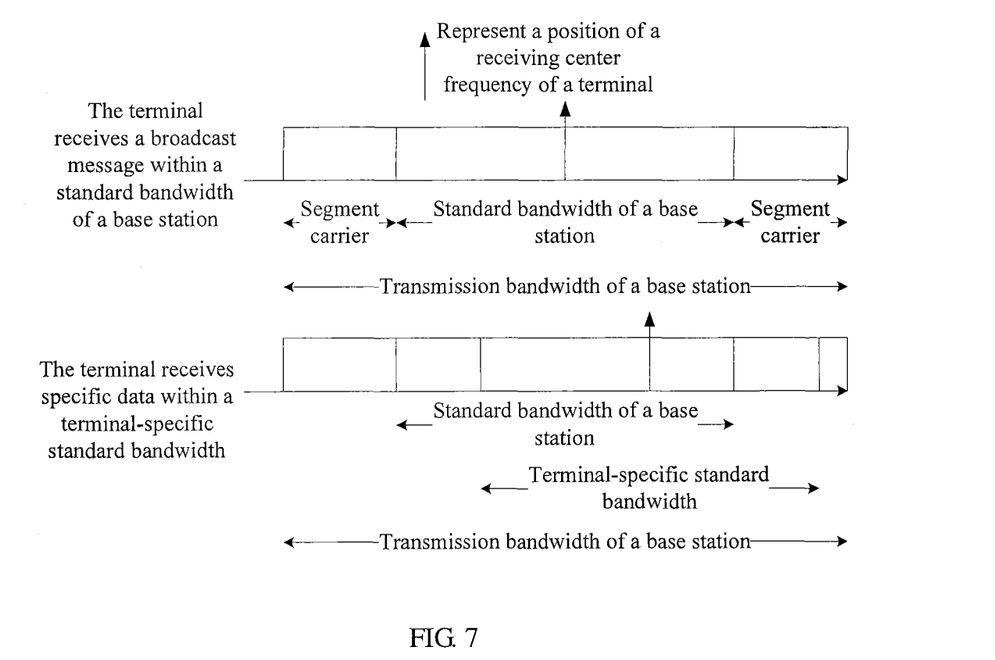
FIG. 7 is a schematic diagram of setting a receiving bandwidth of a terminal in a control area and a data area according to Embodiment 3 of the present invention.

Further, as shown in FIG. 7, when the terminal receives the broadcast message that is sent by the base station within the standard bandwidth of the base station, the terminal adjusts a receiving center frequency to a center frequency of the standard bandwidth of the base station, and adjusts a receiving filter bandwidth to the standard bandwidth of the base station; when the terminal receives the specific data that is sent by the base station within the standard bandwidth of the terminal, the terminal adjusts a receiving center frequency to a center frequency of the standard bandwidth of the terminal, and adjusts a receiving filter bandwidth to the terminal-specific standard bandwidth.

Figure 8:
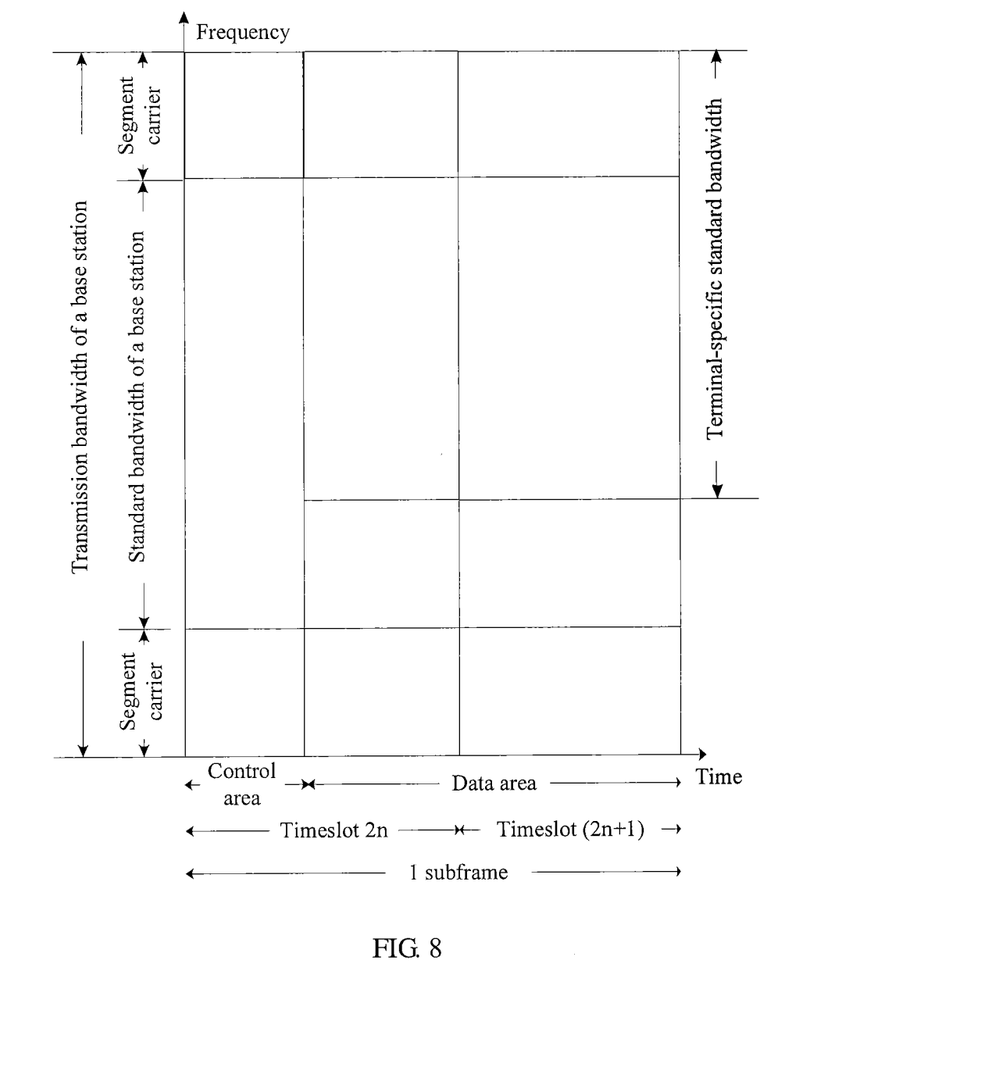
FIG. 8 is a schematic diagram of setting transmission bandwidth of a base station in a multi-terminal scenario according to Embodiment 3 of the present invention.

As shown in FIG. 8, in the 3GPP LTE, a subframe is 1 ms in size and includes two timeslots. Each timeslot is 0.5 ms and includes 6 to 7 symbols. The first few symbols of a first timeslot are used to transmit control signaling of an L1/L2 layer, such as a PBCH, a PCFICH, a PHICH, or a PDCCH, and these symbols are called a control area; and the other symbols are used to transmit a PDSCH, and these symbols are called a data area. In the control area, the terminal receives a synchronization signal and control signaling of the L1/L2 layer within the standard bandwidth of the base station, and the terminal adjusts a receiving center frequency to a center frequency of the standard bandwidth of the base station and adjusts a receiving filter bandwidth to the standard bandwidth of the base station; and in the data area, the terminal receives specific data within the terminal-specific standard bandwidth, and the terminal adjusts a receiving center frequency to a center frequency of the terminal-specific standard bandwidth and adjusts a receiving filter bandwidth to the terminal-specific standard bandwidth.

In the 3GPP LTE, a terminal has two states: an idle state and an active state. In the idle state, the terminal needs to receive only broadcast messages such as a paging message and a system message of the base station sometimes; and in the active state, the terminal needs to receive specific data that is sent to the terminal. In the idle state, all broadcast messages sent by the base station to the terminal are transmitted within the standard bandwidth of the base station; and in the active state, terminal-specific data sent by the base station to the terminal is transmitted within the terminal-specific standard bandwidth. Further, in a subframe in which the terminal-specific data is received, a PDCCH that is sent by the base station to the terminal, and used for instructing the terminal to receive or send a resource message and a PHICH of the base station may also be transmitted within the terminal-specific standard bandwidth only. In this way, when receiving a subframe that includes a system message and a paging message, the terminal receives a signal within the standard bandwidth of the base station, and the terminal adjusts a receiving center frequency to a center frequency of the standard bandwidth of the base station and adjusts a receiving filter bandwidth to the standard bandwidth of the base station; when receiving a subframe that includes terminal-specific data, the terminal receives specific data within the terminal-specific standard bandwidth, and the terminal adjusts a receiving center frequency to a center frequency of the terminal-specific standard bandwidth and adjusts a receiving filter bandwidth to the terminal-specific standard bandwidth.

Alternatively, if a PDCCH is transmitted within the terminal-specific standard bandwidth, but a PCFICH that is used to indicate the size of the control area needs to be transmitted within the standard bandwidth of the base station, a PDCCH of the terminal needs to include information of the control area size, namely, a control format indication (CFI, Control Format Information).

Alternatively, the base station may set terminal-specific downlink standard bandwidth and terminal-specific uplink standard bandwidth separately. The terminal-specific uplink standard bandwidth may be the same as the terminal-specific downlink standard bandwidth, and may also be different from the terminal-specific downlink standard bandwidth. Accordingly, the base station sends terminal-specific data to the terminal within the terminal-specific downlink standard bandwidth, and receives data sent by the terminal within the terminal-specific uplink standard bandwidth. When receiving terminal-specific downlink data, the terminal adjusts a receiving center frequency to a center frequency of the terminal-specific downlink standard bandwidth, adjusts a receiving filter bandwidth to the terminal-specific downlink standard bandwidth, and receives the terminal-specific data sent by the base station. When transmitting terminal-specific uplink data, the terminal adjusts a transmitting center frequency to a center frequency of the terminal-specific uplink standard bandwidth, adjusts a transmitting filter to the terminal-specific uplink standard bandwidth, and sends the terminal-specific uplink data within the terminal-specific uplink standard bandwidth.

Further, the base station may set only terminal-specific downlink standard bandwidth, and receives and sends only downlink data within standard bandwidth, without restricting an uplink transmission bandwidth of the terminal. That is, the terminal may perform transmission in any resource of the transmission bandwidth of the base station, which does not increase complexity of implementation of the terminal. That is because, for the LTE, during uplink transmission, interference onto another user does not occur only if a part of uplink subcarriers are closed. However, the base station and the terminal need to predetermine whether a PUCCH is sent according to the transmission bandwidth of the base station or according to the terminal-specific uplink standard bandwidth. Alternatively, before the terminal obtains the transmission bandwidth of the base station, the terminal performs uplink transmission by using the standard bandwidth of the base station; after the terminal obtains the transmission bandwidth of the base station, if terminal-specific uplink standard bandwidth is set, the terminal performs uplink transmission by using the set terminal-specific uplink standard bandwidth; and if no terminal-specific uplink standard bandwidth is set, the terminal performs transmission by using the transmission bandwidth of the base station.

With the data transmission method provided in this embodiment of the present invention, the base station sets the standard bandwidth of the base station and the terminal-specific standard bandwidth according to the transmission bandwidth of the base station, and notifies the terminal of the configuration information of the standard bandwidth of the base station and the terminal-specific standard bandwidth. A broadcast message is sent to multiple terminals within the standard bandwidth of the base station, and data transmission is performed between the base station and a specific terminal within the terminal-specific standard bandwidth. Compared with the prior art, the base station can control data that is sent to the terminal within different standard bandwidth within the transmission bandwidth of the base station, therefore fully utilizing the transmission bandwidth of the base station; meanwhile, for one terminal, the terminal receives a broadcast message by using standard bandwidth filter of the base station and receives terminal-specific data by using a terminal-specific bandwidth filter, and therefore, the terminal always receives a signal by using standard bandwidth, so that the complexity of implementation of the terminal is not increased.

Embodiment 4

Figure 9:
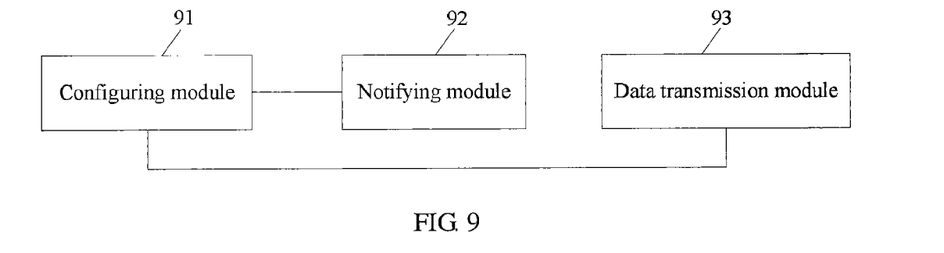
FIG. 9 is a schematic structural diagram of a base station according to Embodiment 4 of the present invention.

This embodiment provides a base station. As shown in FIG. 9, the base station includes:

a configuring module 91, configured to configure a band of standard bandwidth within transmission bandwidth of a base station as terminal-specific standard bandwidth when the transmission bandwidth of the base station is nonstandard bandwidth;

a notifying module 92, configured to notify a terminal of configuration information of the terminal-specific standard bandwidth; and a data transmission module 93, configured to perform data transmission with the terminal within the terminal-specific standard bandwidth.

With the base station provided in this embodiment of the present invention, the base station sets different terminal-specific standard bandwidth for different terminals according to the transmission bandwidth of the base station, notifies the terminal of the configuration information of the terminal-specific standard bandwidth, and performs data transmission with the terminal within the terminal-specific standard bandwidth. Compared with the prior art, the base station can control data that is sent to the terminal within different standard bandwidth within the transmission bandwidth of the base station, therefore fully utilizing the transmission bandwidth of the base station; meanwhile, for one terminal, the terminal always receives a signal by using standard bandwidth, so that complexity of implementation of the terminal is not increased.

Embodiment 5

Figure 10:
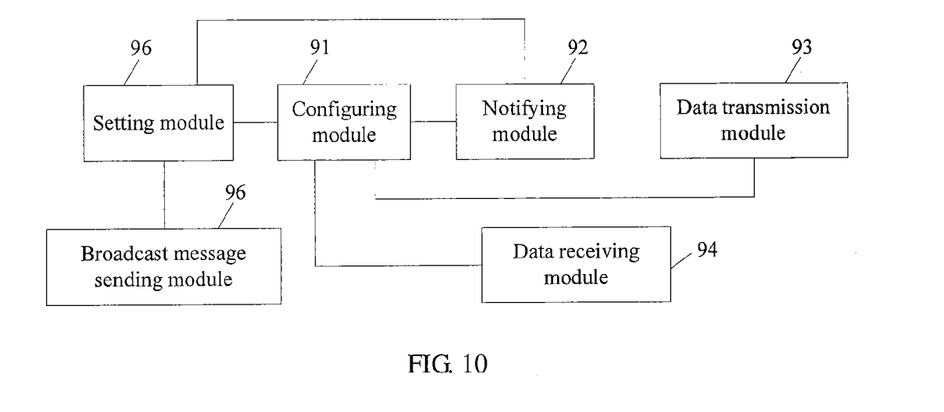
FIG. 10 is a schematic structural diagram of a base station according to Embodiment 5 of the present invention.

As shown in FIG. 10, the base station includes:

A configuring module 91 is configured to configure a band of standard bandwidth within transmission bandwidth of a base station as terminal-specific standard bandwidth when the transmission bandwidth of the base station is nonstandard bandwidth.

Any standard bandwidth less than the transmission bandwidth of the base station may be set as the terminal-specific standard bandwidth.

A notifying module 92 is configured to notify a terminal of configuration information of the terminal-specific standard bandwidth.

The configuration information of the terminal-specific standard bandwidth may include the size and position information of the terminal-specific standard bandwidth.

Further, the configuration information of the terminal-specific standard bandwidth may include effective time of the terminal-specific standard bandwidth. Predetermined effective time is the time when the terminal receives the terminal-specific standard bandwidth configured by the base station.

The base station may notify the terminal of the configuration information of the terminal-specific standard bandwidth through higher-layer signaling such as RRC signaling, or through MAC layer signaling or physical layer signaling. A common manner is that the base station notifies the terminal of the configuration information of the terminal-specific standard bandwidth through higher-layer signaling such as RRC signaling.

A data transmission module 93 is configured to perform data transmission with the terminal within the terminal-specific standard bandwidth.

Further, the configuring module 91 may configure terminal-specific downlink standard bandwidth and terminal-specific uplink standard bandwidth. The terminal-specific uplink standard bandwidth may be the same as the terminal-specific downlink standard bandwidth, and may also be different from the terminal-specific downlink standard bandwidth.

The data transmission module 93 is specifically configured to send data to the terminal within the terminal-specific downlink standard bandwidth, and receive data within the terminal-specific uplink standard bandwidth, where the data is sent by the terminal.

Further, the configuring module 91 may configure only terminal-specific downlink standard bandwidth;

the notifying module 92 is further configured to notify the terminal of transmission bandwidth information of the base station; and the data transmission module 93 is specifically configured to send data to the terminal within the terminal-specific downlink standard bandwidth.

The base station further includes:

a data receiving module 94, configured to receive data within the transmission bandwidth of the base station, where the data is sent by the terminal.

Further, the base station may further include:

a setting module 95, configured to set a band of standard bandwidth within the transmission bandwidth of the base station as standard bandwidth of the base station.

Any standard bandwidth less than the transmission bandwidth of the base station may be set as the standard bandwidth of the base station. Alternatively, standard bandwidth that is closest to and less than the transmission bandwidth of the base station is set as the standard bandwidth of the base station.

Alternatively, the configuring module 91 may configure that the size of the terminal-specific standard bandwidth is the same as that of the standard bandwidth of the base station, and may also configure that the size of the terminal-specific standard bandwidth is different from that of the standard bandwidth of the base station. A common configuration manner is that the configuring module 91 configures that the size of the terminal-specific standard bandwidth is the same as that of the standard bandwidth of the base station.

Alternatively, if it is predetermined that the size of the terminal-specific standard bandwidth is equal to that of the standard bandwidth of the base station, the notifying module 92 may notify the terminal of only position information of the terminal-specific standard bandwidth.

Further, the notifying module 92 is further configured to notify the terminal of setting information of the standard bandwidth of the base station.

The base station may further include:

a broadcast message sending module 96, configured to send a broadcast message to multiple terminals within the standard bandwidth of the base station.

With the base station provided in this embodiment of the present invention, the base station sets the standard bandwidth of the base station and the terminal-specific standard bandwidth according to the transmission bandwidth of the base station, and notifies the terminal of the configuration information of the standard bandwidth of the base station and the terminal-specific standard bandwidth. The base station sends a broadcast message to multiple terminals within the standard bandwidth of the base station, and performs data transmission with a specific terminal within the terminal-specific standard bandwidth. Compared with the prior art, the base station can control data that is sent to the terminal within different standard bandwidth within the transmission bandwidth of the base station, therefore fully utilizing the transmission bandwidth of the base station; meanwhile, for one terminal, the terminal always receives a signal by using standard bandwidth, so that complexity of implementation of the terminal is not increased.

Embodiment 6

Figure 11:
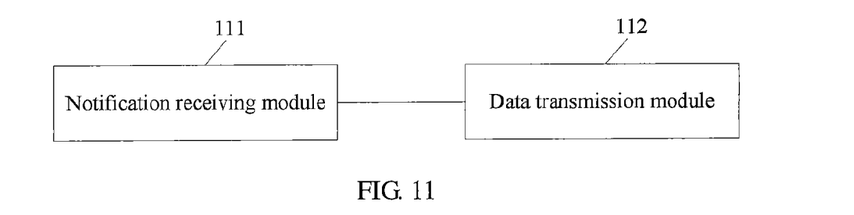
FIG. 11 is a schematic structural diagram of a terminal according to Embodiment 6 of the present invention.

This embodiment provides a terminal. As shown in FIG. 11, the terminal includes:

a notification receiving module 111, configured to receive configuration information of terminal-specific standard bandwidth, where the configuration information is notified by a base station, the terminal-specific standard bandwidth is a band of standard bandwidth within transmission bandwidth of the base station, and the transmission bandwidth of the base station is nonstandard bandwidth; and a data transmission module 112, configured to perform data transmission with the base station by using the terminal-specific standard bandwidth.

With the terminal provided in this embodiment of the present invention, the terminal receives the configuration information of the terminal-specific standard bandwidth, where the configuration information is sent by the base station, and performs data transmission with the base station by using the terminal-specific standard bandwidth. Compared with the prior art, the base station can control data that is sent to the terminal within different standard bandwidth within the transmission bandwidth of the base station, therefore fully utilizing the transmission bandwidth of the base station; meanwhile, for one terminal, the terminal always receives a signal by using standard bandwidth, so that complexity of implementation of the terminal is not increased.

Embodiment 7

Figure 12:
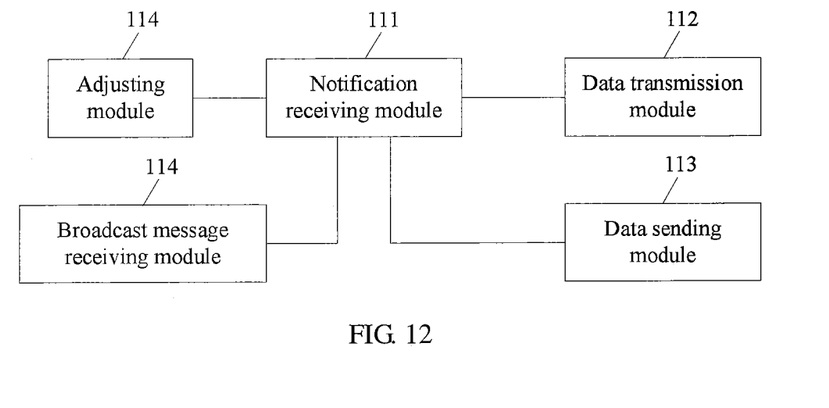
FIG. 12 is a schematic structural diagram of a terminal according to Embodiment 7 of the present invention.

As shown in FIG. 12, the terminal includes:

A notification receiving module 111 is configured to receive configuration information of terminal-specific standard bandwidth, where the configuration information is notified by a base station, the terminal-specific standard bandwidth is a band of standard bandwidth within transmission bandwidth of the base station, and the transmission bandwidth of the base station is nonstandard bandwidth.

The configuration information of the terminal-specific standard bandwidth may include the size and position information of the terminal-specific standard bandwidth. If it is predetermined that the size of the terminal-specific standard bandwidth is equal to that of the standard bandwidth of the base station, the configuration information of the terminal-specific standard bandwidth may include only the position information of the terminal-specific standard bandwidth.

Further, the configuration information of the terminal-specific standard bandwidth may include effective time of the terminal-specific standard bandwidth. Predetermined effective time is the time when the terminal receives the terminal-specific standard bandwidth configured by the base station.

The terminal may receive the configuration information of the terminal-specific standard bandwidth through higher-layer signaling such as RRC signaling, or through MAC layer signaling or physical layer signaling, where the configuration information is sent by the base station. Alternatively, the terminal receives the configuration information of the terminal-specific standard bandwidth through higher-layer signaling such as RRC signaling, where the configuration information is sent by the base station.

A data transmission module 112 is configured to perform data transmission with the base station by using the terminal-specific standard bandwidth.

Further, the notification receiving module 111 may receive configuration information of terminal-specific downlink standard bandwidth and terminal-specific uplink standard bandwidth, where the configuration information is notified by the base station, and the terminal-specific uplink standard bandwidth may be the same as the terminal-specific downlink standard bandwidth, and may also be different from the terminal-specific downlink standard bandwidth.

The data transmission module 112 is specifically configured to receive data by using the terminal-specific downlink standard bandwidth, where the data is sent by the base station, and send data to the base station by using the terminal-specific uplink standard bandwidth.

Further, the notification receiving module 111 may receive only the configuration information of the terminal-specific downlink standard bandwidth, where the configuration information is notified by the base station.

The notification receiving module 111 is further configured to receive transmission bandwidth information of the base station, where the transmission bandwidth information is notified by the base station.

The data transmission module 112 is specifically configured to receive data by using the terminal-specific downlink standard bandwidth, where the data is sent by the base station.

The terminal further includes:

a data sending module 113, configured to send data to the base station by using the transmission bandwidth of the base station.

Further, the notification receiving module 111 is further configured to receive setting information of the standard bandwidth of the base station, where the setting information is notified by the base station, and the standard bandwidth of the base station is a band of standard bandwidth within the transmission bandwidth of the base station.

The terminal may further include:

a broadcast message receiving module 114, configured to receive a broadcast message by using the standard bandwidth of the base station, where the broadcast message is sent by the base station.

Further, the terminal may further include:

an adjusting module 115, configured to: when data transmission is performed with the base station by using the terminal-specific standard bandwidth, adjust a receiving center frequency to a center frequency of the terminal-specific standard bandwidth, and adjust the size of a filter bandwidth to that of the terminal-specific standard bandwidth.

The adjusting module 115 is further configured to: when a broadcast message is received by using the standard bandwidth of the base station, where the broadcast message is sent by the base station, adjust a receiving center frequency to a center frequency of the standard bandwidth of the base station, and adjust the size of a filter bandwidth to that of the standard bandwidth of the base station.

With the terminal provided in this embodiment of the present invention, the terminal receives the configuration information of the terminal-specific standard bandwidth, where the configuration information is sent by the base station, receives a broadcast message by using the standard bandwidth of the base station, where the broadcast message is sent by the base station to multiple terminals, and receives specific data by using the terminal-specific standard bandwidth, where the specific data is sent by the base station to a specific terminal. Compared with the prior art, the base station can control data that is sent to the terminal within different standard bandwidth within the transmission bandwidth of the base station, therefore full utilizing the transmission bandwidth of the base station; meanwhile, for one terminal, the terminal receives a broadcast message by using standard bandwidth filter of the base station, and receives terminal-specific data by using a terminal-specific bandwidth filter, and therefore, the terminal always receives a signal by using standard bandwidth, so that complexity of implementation of the terminal is not increased.

The base station and the terminal that are provided in the embodiments of the present invention may implement the method embodiments provided in the preceding. The data transmission method, the base station, and the terminal that are provided in the embodiments of the present invention may be applied to data transmission between a base station and a terminal in a communication system, which is not limited to herein.

Persons skilled in the art may understand that all or a part of the procedures of the method provided in the preceding embodiments may be implemented by a computer program instructing relevant hardware. The program may be stored in a computer readable storage medium. When the program runs, the steps of the procedures of the method in each preceding embodiment are executed. The storage medium may be a magnetic disk, an optical disk, a read-only memory (Read-Only Memory, ROM), or a random access memory (Random Access Memory, RAM).

The preceding descriptions are merely specific embodiments of the present invention, but are not intended to limit the protection scope of the present invention. Any variation or replacement that may be easily thought of by those skilled in the art shall all fall within the protection scope of the present invention. Therefore, the protection scope of the present invention shall be subject to that of the appended claims.

What is claimed is:

1. A data transmission method, comprising:
configuring a band of standard bandwidth within transmission bandwidth of a base station as terminal-specific standard bandwidth when the transmission bandwidth of the base station is nonstandard bandwidth;
notifying a terminal of configuration information of the terminal-specific standard bandwidth;
performing data transmission with the terminal within the terminal-specific standard bandwidth;
setting a band of standard bandwidth within the transmission bandwidth of the base station as standard bandwidth of the base station;
notifying the terminal of setting information of the standard bandwidth of the base station; and
sending a broadcast message to the terminal within the standard bandwidth of the base station.

2. The method according to claim 1, wherein:
the setting the band of the standard bandwidth within the transmission bandwidth of the base station as the standard bandwidth of the base station comprises:
setting a band of standard bandwidth that is closest to the transmission bandwidth of the base station in size and within the transmission bandwidth of the base station as the standard bandwidth of the base station.

3. The method according to claim 1, wherein:
the configuration information of the terminal-specific standard bandwidth comprises:
position information and effective time of the terminal-specific standard bandwidth; or position information, size, and effective time of the terminal-specific standard bandwidth.

4. The method according to claim 1, wherein:
the sending the broadcast message to the terminal within the standard bandwidth of the base station comprises:
sending the broadcast message to multiple terminals within a bandwidth range shared by the standard bandwidth of the base station and terminal-specific standard bandwidth of the multiple terminals.

5. The method according to claim 1, wherein:
the configuring the band of the standard bandwidth within the transmission bandwidth of the base station as the terminal-specific standard bandwidth comprises:
configuring terminal-specific downlink standard bandwidth and terminal-specific uplink standard bandwidth; and
the performing data transmission with the terminal within the terminal-specific standard bandwidth comprises:
sending data to the terminal within the terminal-specific downlink standard bandwidth, and receiving data within the terminal-specific uplink standard bandwidth, wherein the data is sent by the terminal.

6. The method according to claim 1, wherein:
the method further comprises:
notifying the terminal of transmission bandwidth information of the base station;
the configuring the band of the standard bandwidth within the transmission bandwidth of the base station as the terminal-specific standard bandwidth comprises: configuring terminal-specific downlink standard bandwidth;
the performing data transmission with the terminal within the terminal-specific standard bandwidth comprises: sending data to the terminal within the terminal-specific downlink standard bandwidth; and
the method further comprises: receiving data within the transmission bandwidth of the base station, wherein the data is sent by the terminal.

7. A data transmission method, comprising:
receiving configuration information of terminal-specific standard bandwidth, wherein the configuration information is notified by a base station, the terminal-specific standard bandwidth is a band of standard bandwidth within transmission bandwidth of the base station, and the transmission bandwidth of the base station is nonstandard bandwidth;
performing data transmission with the base station by using the terminal-specific standard bandwidth;
receiving setting information of standard bandwidth of the base station, wherein the setting information is notified by the base station, and the standard bandwidth of the base station is a band of standard bandwidth within the transmission bandwidth of the base station; and
receiving a broadcast message by using the standard bandwidth of the base station, wherein the broadcast message is sent by the base station.

8. The method according to claim 7, wherein:
during the performing data transmission with the base station by using the terminal-specific standard bandwidth, the method further comprises:
adjusting a receiving center frequency to a center frequency of the terminal-specific standard bandwidth, and adjusting a receiving filter bandwidth to the terminal-specific standard bandwidth.

9. The method according to claim 7, wherein:
during the receiving a broadcast message by using the standard bandwidth of the base station, wherein the broadcast message is sent by the base station, the method further comprises:
adjusting a receiving center frequency to a center frequency of the standard bandwidth of the base station, and adjusting a receiving filter bandwidth to the standard bandwidth of the base station.

10. The method according to claim 7, wherein:
the receiving the configuration information of the terminal-specific standard bandwidth, wherein the configuration information is notified by the base station, comprises:
receiving configuration information of terminal-specific downlink standard bandwidth and terminal-specific uplink standard bandwidth, wherein the configuration information is notified by the base station;
the performing data transmission with the base station by using the terminal-specific standard bandwidth comprises:
receiving data by using the terminal-specific downlink standard bandwidth, wherein the data is sent by the base station, and sending data to the base station by using the terminal-specific uplink standard bandwidth.

11. The method according to claim 7, wherein:
the method further comprises: receiving transmission bandwidth information of the base station, wherein the transmission bandwidth information is notified by the base station; and
the receiving the configuration information of the terminal-specific standard bandwidth, wherein the configuration information is notified by the base station, comprises: receiving configuration information of the terminal-specific downlink standard bandwidth, wherein the configuration information is notified by the base station;
the performing data transmission with the base station by using the terminal-specific standard bandwidth comprises: receiving data by using the terminal-specific downlink standard bandwidth, wherein the data is sent by the base station; and
the method further comprises: sending data to the base station by using the transmission bandwidth of the base station.

12. A base station, comprising:
a configuring module, configured to configure a band of standard bandwidth within transmission bandwidth of a base station as terminal-specific standard bandwidth when the transmission bandwidth of the base station is nonstandard bandwidth;
a notifying module, configured to notify a terminal of configuration information of the terminal-specific standard bandwidth;
a data transmission module, configured to perform data transmission with the terminal within the terminal-specific standard bandwidth;
a setting module, configured to set a band of standard bandwidth within the transmission bandwidth of the base station as standard bandwidth of the base station, wherein:
the notifying module is further configured to notify the terminal of setting information of the standard bandwidth of the base station; and
the base station further comprises:
a broadcast message sending module, configured to send a broadcast message to the terminal within the standard bandwidth of the base station.

13. The base station according to claim 12, wherein:

the configuring module is configured to configure terminal-specific downlink standard bandwidth and terminal-specific uplink standard bandwidth; and the data transmission module is configured to send data to the terminal within the terminal-specific downlink standard bandwidth, and receive data within the terminal-specific uplink standard bandwidth, wherein the data is sent by the terminal.

14. The base station according to claim 12, wherein:

the configuring module is configured to configure terminal-specific downlink standard bandwidth;

the notifying module is further configured to notify the terminal of transmission bandwidth information of the base station;

the data transmission module is configured to send data to the terminal within the terminal-specific downlink standard bandwidth; and the base station further comprises:

a data receiving module, configured to receive data within the transmission bandwidth of the base station, wherein the data is sent by the terminal.

15. A terminal, comprising:

a notification receiving module, configured to receive configuration information of terminal-specific standard bandwidth, wherein the configuration information is notified by a base station, the terminal-specific standard bandwidth is a band of standard bandwidth within transmission bandwidth of the base station, and the transmission bandwidth of the base station is nonstandard bandwidth; and a data transmission module, configured to perform data transmission with the base station by using the terminal-specific standard bandwidth, wherein:

the notification receiving module is further configured to receive setting information of standard bandwidth of the base station, wherein the setting information is notified by the base station, and the standard bandwidth of the base station is a band of standard bandwidth within the transmission bandwidth of the base station;

the terminal further comprises:

a broadcast message receiving module, configured to receive a broadcast message by using the standard bandwidth of the base station, wherein the broadcast message is sent by the base station.

16. The terminal according to claim 15, wherein:

the notification receiving module is configured to receive configuration information of terminal-specific downlink standard bandwidth and terminal-specific uplink standard bandwidth, wherein the configuration information is notified by the base station; and the data transmission module is configured to receive data by using the terminal-specific downlink standard bandwidth, wherein the data is sent by the base station, and send data to the base station by using the terminal-specific uplink standard bandwidth.

17. The terminal according to claim 15, wherein:

the notification receiving module is configured to receive configuration information of terminal-specific downlink standard bandwidth, wherein the configuration information is notified by the base station;

the notification receiving module is further configured to receive transmission bandwidth information of the base station, wherein the transmission bandwidth information is notified by the base station;

the data transmission module is configured to receive data by using the terminal-specific downlink standard bandwidth, wherein the data is sent by the base station; and the terminal further comprises:

a data sending module, configured to send data to the base station by using the transmission bandwidth of the base station.

* * * * *